US012646060B2

(12) United States Patent
Collins et al.

(10) Patent No.: US 12,646,060 B2
(45) Date of Patent: Jun. 2, 2026

(54) METHOD AND SYSTEM OF PROVIDING INTEROPERABILITY BETWEEN DIFFERENT PAYMENT RAILS

(71) Applicant: MASTERCARD INTERNATIONAL INCORPORATED, Purchase, NY (US)

(72) Inventors: Simon Collins, Rye, NY (US); Jared Levin, Mamaroneck, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 108 days.

(21) Appl. No.: 17/551,797

(22) Filed: Dec. 15, 2021

(65) Prior Publication Data

US 2023/0186300 A1     Jun. 15, 2023

(51) Int. Cl.
*G06Q 20/38*          (2012.01)
*G06Q 20/02*          (2012.01)
(Continued)

(52) U.S. Cl.
CPC ......... *G06Q 20/389* (2013.01); *G06Q 20/065* (2013.01); *G06Q 20/102* (2013.01); *G06Q 20/409* (2013.01)

(58) Field of Classification Search
CPC .. G06Q 20/389; G06Q 20/065; G06Q 20/102; G06Q 20/409; G06Q 20/00–425
See application file for complete search history.

(56) References Cited

U.S. PATENT DOCUMENTS

2003/0004867 A1*  1/2003  Kight ..................... G06Q 20/04
                                                            705/39
2017/0270493 A1*  9/2017  Lugli ..................... G06Q 20/10
                          (Continued)

FOREIGN PATENT DOCUMENTS

CN          110610416 A     12/2019

OTHER PUBLICATIONS

International Search Report and Written Opinion dated Feb. 24, 2023, corresponding to PCT/US2022/049118 (10 Pages).
(Continued)

*Primary Examiner* — Patrick Mcatee
*Assistant Examiner* — Christina C Stevenson
(74) *Attorney, Agent, or Firm* — Panitch Schwarze Belisario & Nadel LLP

(57)            ABSTRACT

A method for facilitating a payment transaction between incompatible and unconnected payment networks includes: receiving, by a receiver of a processing server, a transaction request from a first computing device, the transaction request including at least a first payment network identifier and a second payment network identifier; identifying, by a processor of the processing server, a first network profile associated with a first payment network based on the first payment network identifier and a second network profile associated with a second payment network based on the second payment network identifier; determining, by the processor of the processing server, one or more incremental data values required for the second payment network based on a comparison of the first network profile with the second network profile; and transmitting, by a transmitter of the processing server, the one or more incremental data values to the first computing device.

16 Claims, 5 Drawing Sheets

(51) Int. Cl.

| | | |
|---|---|---|
| *G06Q 20/06* | (2012.01) | |
| *G06Q 20/10* | (2012.01) | |
| *G06Q 20/40* | (2012.01) | |

(56) References Cited

U.S. PATENT DOCUMENTS

| | | | |
|---|---|---|---|
| 2018/0227204 A1* | 8/2018 | Magielse, Sr. | H04L 43/0817 |
| 2019/0332702 A1* | 10/2019 | Manamohan | G06F 11/3006 |
| 2021/0182810 A1* | 6/2021 | Johnston | G06Q 20/085 |
| 2021/0312439 A1* | 10/2021 | Pacher | G06Q 20/22 |

OTHER PUBLICATIONS

"Smart Contracts: The Blockchain Technology That Will Replace Lawyers", https://blockgeeks.com/guides/smart-contracts/, retrieved Jan. 2020.

Bhaskaran, et al., "Double-Blind Consent-Driven Data Sharing on Blockchain", 2018 IEEE International Conference on Cloud Engineering (IC2E), Apr. 2018, pp. 385-391.

Mell, et al., "Smart Contract Federated Identity Management without Third Party Authentication Services", arXiv:1906.11057, Jun. 2019, 13 pages.

Nguyen, et al., "CVSS: A Blockchainized Certificate Verifying Support System", Proceedings of the Ninth International Symposium on Information and Communication Technology, Dec. 2018, pp. 436-442.

Rivest, "All-or-Nothing Encryption and the Package Transform", Lecture Notes in Computer Science, vol. 1267, 1997, pp. 210-218.

Wikipedia, "All-or-nothing transform," wikipedia.org/wiki/All-or-nothing_transform, downloaded Dec. 8, 2021, 2 pages.

* cited by examiner

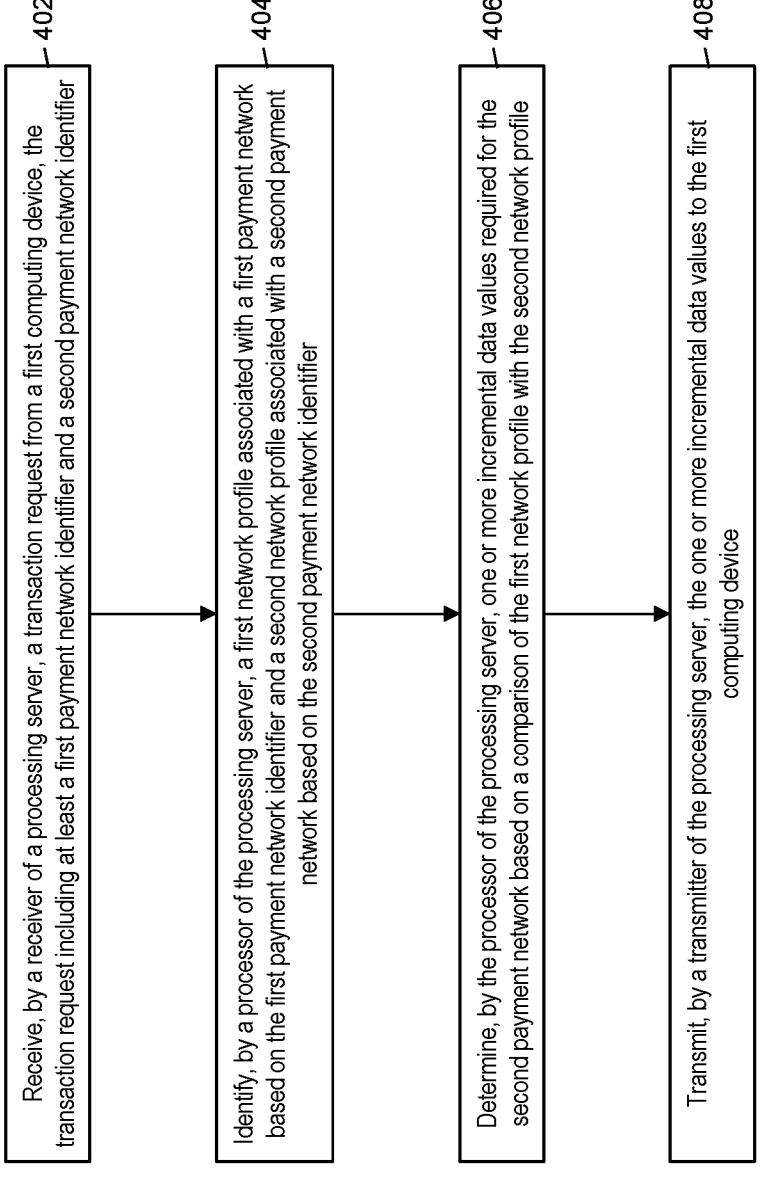

402

Receive, by a receiver of a processing server, a transaction request from a first computing device, the transaction request including at least a first payment network identifier and a second payment network identifier

404

Identify, by a processor of the processing server, a first network profile associated with a first payment network based on the first payment network identifier and a second network profile associated with a second payment network based on the second payment network identifier

406

Determine, by the processor of the processing server, one or more incremental data values required for the second payment network based on a comparison of the first network profile with the second network profile

408

Transmit, by a transmitter of the processing server, the one or more incremental data values to the first computing device

METHOD AND SYSTEM OF PROVIDING INTEROPERABILITY BETWEEN DIFFERENT PAYMENT RAILS

FIELD

The present disclosure relates to interoperability between different payment rails, specially facilitating payment transactions between two payment networks that are incompatible and unconnected.

BACKGROUND

Traditionally, consumers have selected payment methods for transactions based on a combination of convenience and benefits for the method. For example, some consumers prefer to use cash because they like having the physical currency, some prefer to use debit cards because of convenience and consumer protection features, and some prefer credit cards because of valuable reward programs. As the usage of debit and credit cards increased, a number of different payment processors emerged, each offering their own benefits and features to their customers. However, each payment processor utilize their own payment rails, which are independent and differ from the payment rails of other processors. The result is that a consumer that wants to use a credit card for a specific processor must ensure that the merchant with whom they want to transact accepts that card and has a connection to the appropriate payment rails.

Because not every merchant accepts every type of payment method, consumers wishing to maximize their ability to pay for transactions with credit cards must be issued a card from every payment processor. Fortunately, because traditional payment processors use the same currency, a consumer can pay credit card statements and fees from a single transaction account without significantly difficulty.

However, in recent years, the rise of blockchain has resulted in a significant number of digital currencies that are available for consumer use. Some digital currencies have become prominent enough to be accepted for payment at both physical retailers and through electronic commerce. As such, some consumers may be interested in collecting and using new digital currencies or other alternative payment methods. However, adoption for alternative payment methods is not widespread. At the same time, a consumer may be interested in using such a payment method for a transaction.

Currently, the only solution for such a consumer is to convert their digital currency to a different currency that is accepted by the merchant with which the consumer wants to transact, and then use the different currency in a standard transaction. This can be a time consuming and laborious process, and may also be undesirable because of fees and other limitations. Thus, there is a need for a technological solution to enable a payment transaction to be conducted across two different payment rails, which can even involve two different currencies, with a minimal increase in effort or change in processors for consumers and payment networks.

SUMMARY

The present disclosure provides a description of systems and methods for facilitating a payment transaction between incompatible and unconnected payment networks. A consumer can wish to pay for a transaction using a first payment network, while a recipient of the transaction may have a desire to receipt payment using a second payment network. The consumer can submit a request for such a transaction to a processing server as a centralized platform. The processing server can identify the incremental data necessary to satisfy the needs of both payment networks and notify the consumer of the incremental data. The processing server can also provide the consumer with a transaction account used by the processing server to receive funds using the first payment network. The consumer can then initiate a payment transaction to the transaction account using the first payment network, while also supplying the necessary incremental data. The processing server can receive the funds via the transaction account and then initiate a second payment transaction to the recipient using the second payment network, utilizing the incremental data supplied by the consumer to comply with any necessary requirements and standards of the second payment network. The second payment transaction can utilize a transaction account of the processing server that is configured for use with the second payment network. The result is that both the consumer and recipient can transact using their network of choice, without either payment network having to change their configuration or operation, without the recipient having to perform any actions different from a standard transaction, and with the consumer only having to supply any additional data as necessary for the second payment network. Thus, transactions are made available that have been historically unavailable with little effort necessary from involved parties as a result of the methods and systems discussed herein.

A method for facilitating a payment transaction between incompatible and unconnected payment networks includes: receiving, by a receiver of a processing server, a transaction request from a first computing device, the transaction request including at least a first payment network identifier and a second payment network identifier; identifying, by a processor of the processing server, a first network profile associated with a first payment network based on the first payment network identifier and a second network profile associated with a second payment network based on the second payment network identifier; determining, by the processor of the processing server, one or more incremental data values required for the second payment network based on a comparison of the first network profile with the second network profile; and transmitting, by a transmitter of the processing server, the one or more incremental data values to the first computing device.

A system for facilitating a payment transaction between incompatible and unconnected payment networks includes: a first payment network; a second payment network; a first computing device; and a processing server, the processing server including a receiver receiving a transaction request from the first computing device, the transaction request including at least a first payment network identifier and a second payment network identifier, a processor identifying a first network profile associated with the first payment network based on the first payment network identifier and a second network profile associated with the second payment network based on the second payment network identifier, and determining one or more incremental data values required for the second payment network based on a comparison of the first network profile with the second network profile, and a transmitter transmitting the one or more incremental data values to the first computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a flow chart illustrating an exemplary method for facilitating a payment transaction between incompatible and unconnected payment networks in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Facilitating Payment Transactions Between Payment Networks

Figure 1:
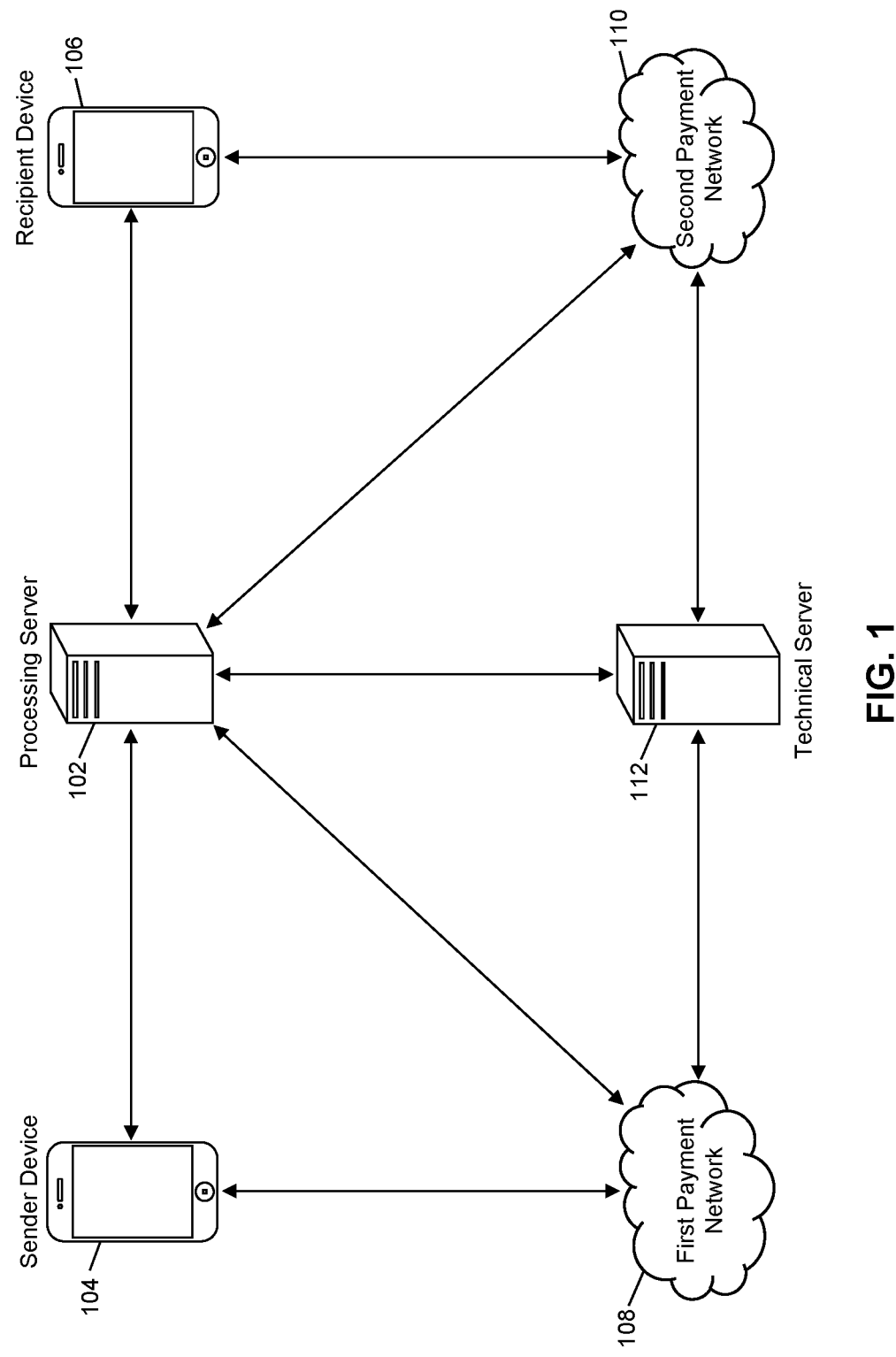
FIG. 1 is a block diagram illustrating a high-level system architecture for facilitating a payment transaction between payment networks in accordance with exemplary embodiments.

FIG. 1 illustrates a system 100 for facilitating a payment transaction between two payment networks that are unconnected and/or incompatible.

The system 100 can include a processing server 102. The processing server 102, discussed in more detail below, can be configured to facilitate a payment transaction between two parties that is between two different payment networks, where the payment networks can be unconnected, incompatible, and even utilize different currencies. As discussed herein, the term "payment network" can refer to a system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Such payment networks can also include various real-time payment networks, domestic payment networks, central bank digital currencies and entities associated therewith, etc. Use of the term "payment network" herein may refer to both the payment network as an entity, and the physical payment network, such as the equipment, hardware, and software comprising the payment network.

As discussed herein, the term "payment transaction" can refer to a transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing. Additionally, as referred to herein, the term "payment transaction" can, as mentioned above, refer to any transaction between two entities with an exchange of financial benefit. This can include, for example, wire transfers, ACH transactions, credit and debit card transactions, digital payments networks, cryptographic currency transactions, etc., each of which can utilize different processes and entities as applicable. Accordingly, while the methods and systems discussed herein can refer to a payment card transaction, any type of payment transaction can be suitable for use in conjunction with the discussed methods and systems. A "transaction account" can refer to a financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, Zelle®, etc.

In the system 100, a payer and a payee for a payment transaction may utilize a sender device 104 and a recipient device 106, respectively, to exchange details regarding the proposed payment transaction. The sender device 104 and recipient device 106 can be any type of computing device suitable for performing the functions discussed herein, such as a desktop computer, laptop computer, notebook computer, tablet computer, cellular phone, smart phone, smart watch, smart television, wearable computing device, etc. The sender device 104 may, for example, electronically transmit a message, such as an e-mail, short messaging service message, multimedia messaging service message, etc., to the recipient device 106 using a suitable communication network and method, where the message requests transaction account details for a transaction account the payee would like to use to receive the funds for the payment transaction. The payee may, using the recipient device 106, select a transaction account for receiving payment and electronically transmit account details for the transaction account back to the sender device 104. The account details may include at least an account number and a network identifier that uniquely identifies a second payment network 110 with which the transaction account is associated.

The sender device 104 may receive the account details from the recipient device 106 and may, using a suitable interface, receive a selection of account details for a transaction account through which the transaction is to be funded as selected by the payer as a user of the sender device 104. The account details for the funding transaction account may similarly include an account number for the transaction account and a network identifier associated with a first payment network 108 associated with the funding transaction account.

In an exemplary embodiment, the sender device 104 may select a first payment network 108 for use while the recipient device 106 may select a second payment network 110 for use. The first payment network 108 and second payment network 110 may be different payment networks and may, in some cases, be unconnected and incompatible. In some instances, the first payment network 108 and second payment network 110 may utilize different currencies. In an exemplary embodiment, the first payment network 108 and second payment network 110 may utilize one or more different rules, regulations, or standards, collectively referred to herein as "standards," for the processing of payment transactions across the payment network's payment rails. For example, the first payment network 108 and second payment network 110 may require different formatting for transaction messages, different formatting for specific values (e.g., date or time formatting), and different data generally for inclusion in the transaction message. For instance, the first payment network 108 may require a bank identification number for a financial institution that issued the funding transaction account, whereas the second payment network 110 may require the bank identification number as well as a routing number for the financial institution.

Once the sender device 104 has received the account details for the transaction account selected by the recipient device 106, also referred to herein as a receiving transaction account, the sender device 104 may electronically transmit a payment request to the processing server 102 using a suitable communication network and method, such as via a web page or application program executed by the sender device 104 that submits the payment request to the processing server 102 via the Internet, an application programming interface, etc. The payment request may include the network identifiers for the first payment network 108 and the second payment network 110. In some instances, the payment request may also include the transaction account numbers, at least one currency amount (e.g., used by the first payment network 108), communication information for the recipient device 106 (e.g., telephone number, e-mail address, username, etc.), etc.

The processing server 102 can receive the payment request and can identify the first payment network 108 and the second payment network 110 using the received network identifiers. The processing server 102 can identify a profile associated with each of the payment networks 108 and 110 using the network identifiers where the profile includes information regarding the standards used by the respective payment network. The information regarding the standards may include a list of all data values and any associated formatting rules for inclusion in a transaction message that is configured for processing as a payment transaction by the respective payment network. The processing server 102 can analyze the information for both payment networks 108 and 110 and identify a set of incremental data values. The incremental data values may include all data values that are required by the second payment network 110 that are not required by the first payment network 108 for a payment transaction being processed by the respective payment network. In the above example, a routing number for the receiving financial institution can be considered an incremental data value.

The processing server 102 can also identify a transaction account associated with the processing server 102 that is configured for use with the first payment network 108. In an exemplary embodiment, the processing server 102 can have access to a transaction account for every payment network that the processing server 102 is configured to facilitate transactions for, where each such transaction account may utilize the currency associated with the corresponding payment network and may be in compliance with the standards of the payment network as required. The processing server 102 can open such a transaction account during a registration process of a payment network with the processing server 102, where the processing server 102 can also receive all of the applicable standards for the payment network during the registration process.

After the payment networks 108 and 110 have been identified and the set of incremental data values determined, the processing server 102 can electronically transmit a return message to the sender device 104 that includes the identified set of incremental data values. The return message can also include account details for the processing server's transaction account that can be used with the first payment network 108, where the transaction details include at least the transaction account number and any additional necessary details as may be required by the first payment network 108. In one embodiment, the processing server 102 can generate or otherwise identify a unique data value for the payment transaction, referred to herein as a "transaction identifier," which can be included in the return message transmitted to the sender device 104.

The sender device 104 can receive the return message and prompt the payer a user thereof to proceed with the payment transaction for payment to the payee as a user of the recipient device 106. As part of the prompt, the sender device 104 may require the payer to provide data for each incremental data value in the set of incremental data values included in the return message. For instance, in the above example, the sender device 104 may require the payer to provide a routing number for the financial institution that issued the transaction account to be used by the recipient device 106 to receive the funds for the payment transaction. If such data is not already available to the payer or sender device 104 (e.g., collected during an initial exchange with the recipient device 106), then the sender device 104 may receive such data from the recipient device 106 or other suitable system or entity before proceeding.

Once the sender device 104 has all of the required data, the sender device 104 may initiate a first payment transaction. The first payment transaction may be submitted to the first payment network 108 by the sender device 104 or a suitable intermediary system, such as an issuing financial institution that issued the transaction account used by the payer to fund the payment transaction. The first payment transaction may be made for payment to the transaction account identified by the processing server 102 whose account details were included in the return message and may be made for a currency amount identified by the sender device 104. In some cases, the currency amount may be greater than a currency amount initially identified by the sender device 104, such as to account for any fees required by the processing server 102, recipient device 106, first payment network 108, or second payment network 110. For instance, the payer may be required to pay $102 to ensure that the payee receives $100 due to fees incurred in the system 100.

For the first payment transaction, a transaction message may be electronically transmitted to the first payment network 108 using payment rails associated therewith, where the transaction message is formatted according to one or more standards governing the exchange of financial transaction messages using the first payment network 108. The standards may affect the data elements of the transaction message, the data stored therein, the formatting of the data, the use of bitmaps, and other aspects and criteria of the transaction message. The transaction message may include data stored in data elements as required by the first payment network 108 and may further include the data for the incremental data values, which can be stored in a data element reserved for private use in the transaction message. The transaction message may also include a data element that stores the transaction identifier provided by the processing server 102 in the return message, which may be a data element reserved for private use according to the applicable standard(s).

The first payment network 108 can receive the transaction message and process the first payment transaction using traditional methods. As part of the processing of the first payment transaction, payment may be made for the currency amount included in the transaction message to the transaction account specified by the processing server 102. The processing server 102 can be informed of the payment transaction using suitable methods. In an exemplary embodiment, the processing server 102 can receive a notification message from the first payment network 108 or a suitable third party (e.g., a financial institution or other entity that issued the transaction account used by the processing server 102 to receive payment in the first payment transaction) for the transaction. The notification message may include transaction details that include the currency amount, the transaction identifier, and the data for the incremental data values.

Once the processing server 102 has received notification of the successful processing of the first payment transaction, the processing server 102 can initiate a second payment transaction. The second payment transaction may be a transaction for payment of the currency amount, or a different amount based thereon, from a transaction account used by the processing server 102 using the second payment network 110 to the transaction account selected by the payee as a user of the recipient device 106. In cases where the first payment network 108 and second payment network 110 utilize different currencies, the processing server 102 can determine the currency amount for the second payment transaction using a suitable currency exchange algorithm or as provided by the sender device 104 in the payment request. For the second payment transaction, a transaction message may be electronically transmitted to the second payment network 110 using payment rails associated therewith, where the transaction message is formatted according to one or more standards governing the exchange of financial transaction messages using the second payment network 110. The standards may affect the data elements of the transaction message, the data stored therein, the formatting of the data, the use of bitmaps, and other aspects and criteria of the transaction message. The transaction message may include data stored in data elements as required by the second payment network 110, which includes the data for the incremental data values. The transaction message may also include a data element that stores the transaction identifier provided by the processing server 102 in the return message, which may be a data element reserved for private use according to the applicable standard(s).

The second payment network 110 can receive the transaction message and process the payment transaction using traditional methods. As part of the processing of the second payment transaction, payment may be made for the stated currency amount to the transaction account as selected by the payee as a user of the recipient device 106. As a result, the payer will have paid the processing server 102 using the first payment network 108 and the processing server 102 will have paid the payee an equivalent amount using the second payment network 110, without requiring any modification to the first payment network 108, second payment network 110, or any involved financial institutions, and requiring no additional actions by the payee and recipient device 106 than in a standard, traditional transaction.

In some embodiments, the sender device 104 may provide the processing server 102 directly with data to satisfy the set of incremental data values. In such embodiments, the sender device 104 may respond to the return message with a follow-up message that includes the data for the set of incremental data values. The processing server 102 can receive the data and include the data in the submission for the second payment transaction submitted to the second payment network 110. In some cases, the data for the set of incremental data values can be left out from the first payment transaction. In these cases, the processing server 102 can use the transaction identifier to identify when the first payment network has been processed and for use in identifying the data for the set of incremental data values to include in the second payment transaction that is submitted to the second payment network 110 for processing.

In some embodiments, the system 100 may include a technical server 112. The technical server 112 may be a computing device configured to assist the processing server 102 in facilitating the payment transaction across the first payment network 108 and second payment network 110. The technical server 112 can be, for example, a device that monitors the payment rails for the payment networks 108 and 110 for transaction messages, a server associated with one or more financial institutions for collecting transaction messages or other data regarding payment transactions for reporting to the processing server 102, etc. In an example, the technical server 112 can be a system that monitors transactions involving transaction accounts used by the processing server 102 and collects transaction data for any applicable payment transactions. The technical server 112 may receive the transaction message or otherwise receive transaction details for the first payment transaction processed by the first payment network 108 and electronically transmit the transaction details to the processing server 102. In some embodiments, the processing server 102 can be further configured to perform functions of the technical server 112 as discussed herein. In other embodiments, the technical server 112 and processing server 102 may be a part of a single computing environment or system.

In some embodiments, the processing server 102 can be configured to electronically transmit data messages to the recipient device 106. Data messages can include notification messages, such as to notify the recipient device 106 of an upcoming payment transaction following receipt of the payment request. Data messages can also include requests for data, such as a request to confirm a currency amount to be used in the second payment transaction prior to transmitting a return message to the sender device 104 and/or to confirm other data, such as the account details included in the payment request. In some instances, the processing server 102 can request data for the set of incremental data values from the recipient device 106 in place of or in addition to requesting the data from the sender device 104.

The methods and systems discussed herein enable a payment transaction to be facilitated that involves two different payment networks 108 and 110 that can be unconnected and incompatible using the processing server 102. By identifying the appropriate incremental data values and utilizing transaction accounts associated with each of the payment networks 108 and 110, the processing server 102 can facilitate such a payment transaction without requiring any modification to the payment networks 108 and 110 or any involved financial institutions. The payment transaction can also be facilitated without any additional activity of the payee and recipient device 106 beyond what is required in a traditional payment transaction. As a result, the methods and systems discussed herein facilitate transactions that are impossible using traditional systems and in a manner that is unobtrusive to involved entities.

Processing Server

Figure 2:
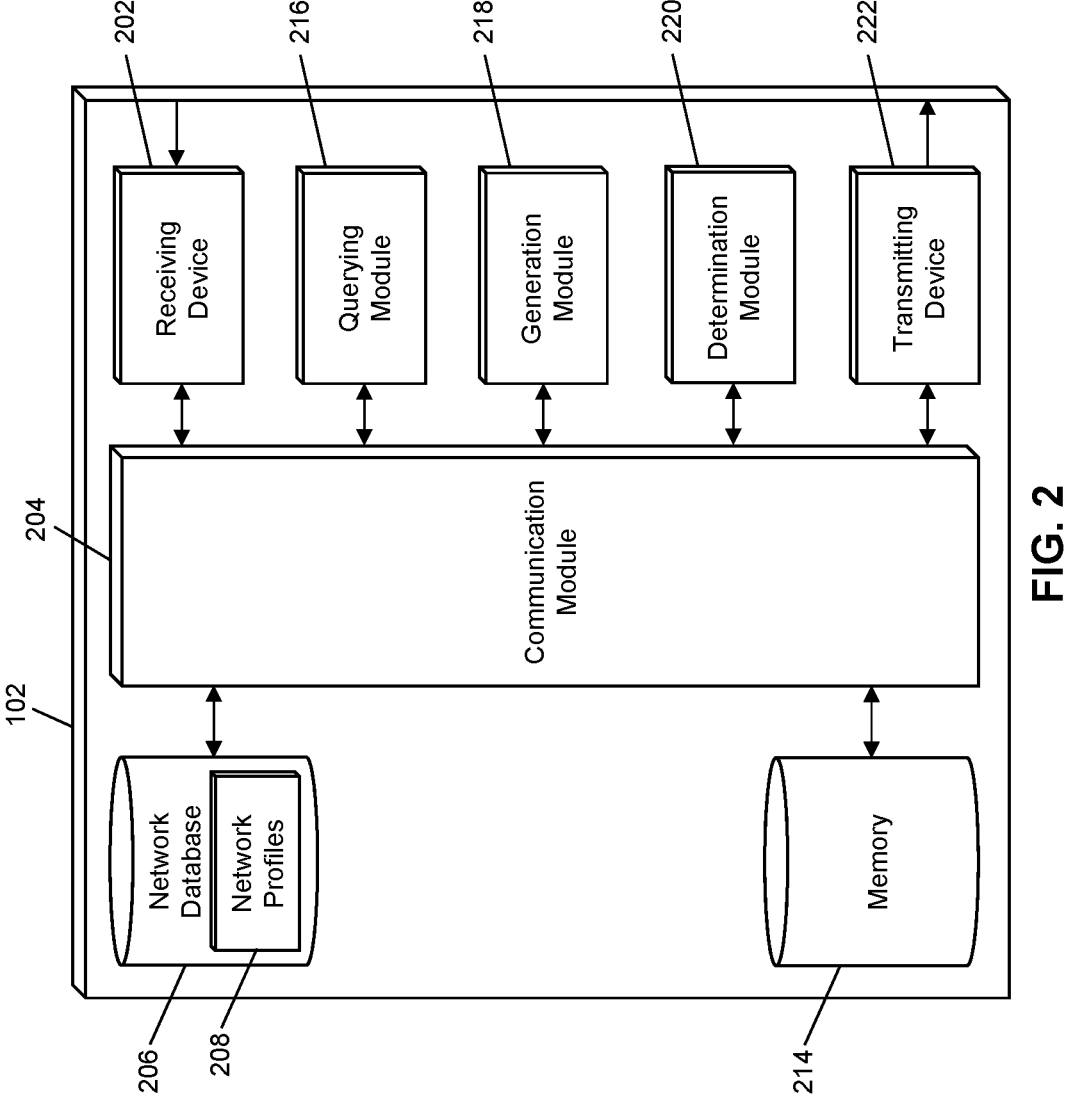
FIG. 2 is a block diagram illustrating the processing server in the system of FIG. 1 for facilitating a payment transaction between payment networks in accordance with exemplary embodiments.

FIG. 2 illustrates an embodiment of the processing server 102 in the system 100. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 500 illustrated in FIG. 5 and discussed in more detail below can be a suitable configuration of the processing server 102. Additional components in the system 100, such as sender device 104, recipient device 106, and technical server 112 can include components illustrated in FIG. 2 and discussed below.

The processing server 102 can include a receiving device 202. The receiving device 202 can be configured to receive data over one or more networks via one or more network protocols. In some instances, the receiving device 202 can be configured to receive data from sender devices 104, recipient devices 106, payment networks 108 and 110, technical servers 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by sender devices 104 that can be superimposed or otherwise encoded with payment requests, data for incremental data values, communication data, currency amounts, account details, etc. The receiving device 202 can also be configured to receive data signals electronically transmitted by recipient devices 106, which can be superimposed or otherwise encoded with account details, data for incremental data values, approval messages for payment transactions, etc. The receiving device 202 can be further configured to receive data signals electronically transmitted by payment networks 108 and 110 that can be superimposed or otherwise encoded with registration data including standard information, communication data for payment rails, transaction messages, etc. The receiving device 202 can also receive data signals electronically transmitted by payment networks 108 and 110 and/or technical servers 112, which can be superimposed or otherwise encoded with transaction messages and/or notification messages regarding processed payment transactions.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, determination module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can include a network database 206. The network database 206 can be configured to store a plurality of network profiles 208 using a suitable data storage format and schema. The network database 206 can be a relational database that utilizes structured query language for the storage, identification, modifying, updating, accessing, etc. of structured data sets stored therein. Each network profile 208 can be a structured data set configured to store data related to one or more payment networks 108 and 110. Each network profile 208 can include, for example, the network identifier associated with each related payment network, communication data for payment rails for the related payment network(s), and standards information for each related payment network, which can include a list of all data values required by a related payment network for the successful processing of a payment transaction.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, communication information, data formatting rules, standards data, currency exchange algorithms, financial institution data, etc.

The processing server 102 can include a querying module 216. The querying module 216 can be configured to execute queries on databases to identify information. The querying module 216 can receive one or more data values or query strings, and can execute a query string based thereon on an indicated database, such as the memory 214 of the processing server 102 to identify information stored therein. The querying module 216 can then output the identified information to an appropriate engine or module of the processing server 102 as necessary. The querying module 216 can, for example, execute a query on the network database 206 to identify network profiles 208 for the payment networks 108 and 110 after receiving a payment request from the sender device 104.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate notification messages, confirmation messages, request messages, currency amounts, transaction identifiers, transaction messages, etc.

The processing server 102 can also include a determination module 220. The determination module 220 can be configured to perform determinations for the processing server 102 as part of the functions discussed herein. The determination module 220 can receive instructions as input, which can also include data to be used in performing a determination, can perform a determination as requested, and can output a result of the determination to another module or engine of the processing server 102. The determination module 220 can, for example, be configured to determine sets of incremental data values by comparing standards information included in two network profiles 208 to identify data values required by the second payment network 110 that are not required by the first payment network 108 for payment transactions processed by the respective payment network.

The processing server 102 can also include a transmitting device 222. The transmitting device 222 can be configured to transmit data over one or more networks via one or more network protocols. In some instances, the transmitting device 222 can be configured to transmit data to sender devices 104, recipient devices 106, payment networks 108 and 110, technical servers 112, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to sender devices 104 that can be superimposed or otherwise encoded with sets of incremental data values, transaction identifiers, transaction account details, data requests, currency requests, etc. The transmitting device 222 can also be configured to electronically transmit data signals to recipient devices 106, which can be superimposed or otherwise encoded with data requests, notification messages, messages requesting confirmation of currency amounts, etc. The transmitting device 222 can be further configured to electronically transmit data signals to payment networks 108 and 110 that can be superimposed or otherwise encoded with identifier requests, requests for standards information, transaction messages, requests for transaction information, etc. The transmitting device 222 can also be configured to electronically transmit data signals to technical servers 112, which can be superimposed or otherwise encoded with requests for payment transaction data that can include a transaction identifier for which transaction messages or other transaction data is requested.

Process for Facilitating a Payment Transaction

Figure 3:
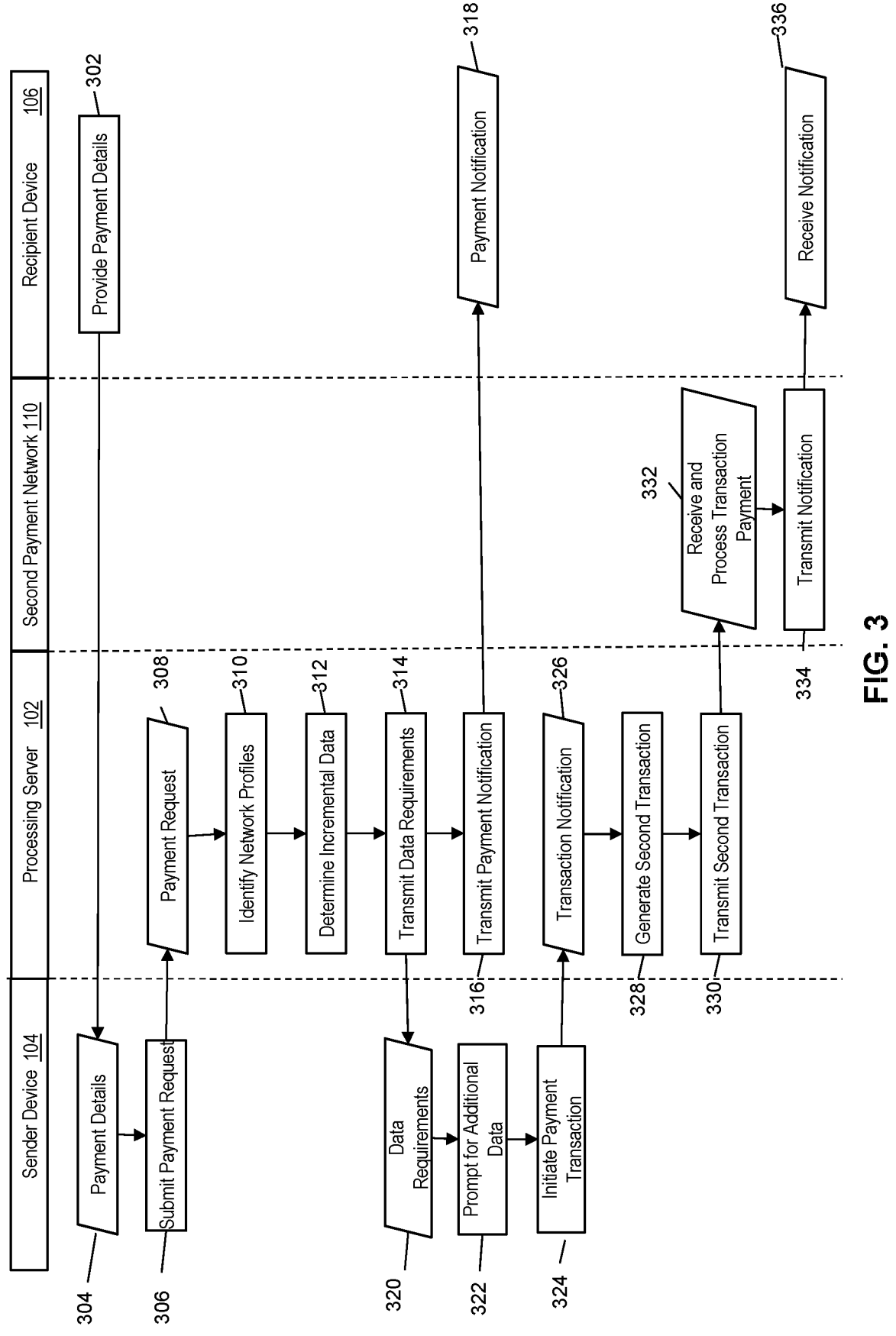
FIG. 3 is a flow diagram illustrating a process for facilitating a payment transaction between payment networks in the system of FIG. 1 in accordance with exemplary embodiments.

FIG. 3 illustrates a process for facilitating a payment transaction involving two incompatible, unconnected payment networks 108 and 110 in the system 100 of FIG. 1.

In step 302, the recipient device 106 may electronically transmit payment details for a transaction account selected by the payee as a user thereof for receiving payment using the second payment network 110 to the sender device 104 using a suitable communication network and method. The payment details may include at least an account number for the transaction account and a network identifier for the second payment network 110. In step 304, the sender device 104 may receive the payment details from the recipient device 106. In step 306, the sender device 104 may submit a payment request to the processing server 102 using a suitable communication network and method. The payment request can include at least the payment details received from the recipient device 106, a currency amount for payment to the payee, and payment details for a transaction account selected by the payer as a user of the sender device 104 for funding a payment using the first payment network 108, where such funding details can include an account number for the funding transaction account and a network identifier for the first payment network 108.

In step 308, the receiving device 202 of the processing server 102 can receive the payment request from the sender device 104. In step 310, the querying module 216 of the processing server 102 can execute one or more queries on the network database 206 of the processing server 102 to identify a first network profile 208 for the first payment network 108 and a second network profile 208 for the second payment network 110 using the associated network identifiers included in the payment request. In step 312, the determination module 220 of the processing server 102 can determine a set of incremental data values that is required to facilitate a payment transaction involving both payment networks 108 and 110 by comparing standards information included in the first and second network profiles 208, where the incremental data values correspond to data values required by the second payment network 110 that are not required by the first payment network 108 for payment transactions processed by the respective payment network.

In step 314, the transmitting device 222 of the processing server 102 can electronically transmit data requirements to the sender device 104 using a suitable communication network and method. The data requirements can include the set of incremental data values, as well as a transaction identifier generated by the generation module 218 of the processing server 102 for use in tracking all messages associated with the payment transaction, and account details for a transaction account used by the processing server 102 to receive payments using the first payment network 108. In step 316, the transmitting device 222 of the processing server 102 can electronically transmit a payment notification message to the recipient device 106 using a suitable communication network and method. The payment notification message may include a notification that payment to the payee via the second payment network 110 is upcoming, and may include any additional information as desired by the processing server 102 and/or recipient device 106, such as the transaction identifier, payment amount, etc. In step 318, the recipient device 106 can receive the notification message from the processing server 102 for presentation to the payee as a user thereof.

In step 320, the sender device 104 can receive the data requirements from the processing server 102 that include the set of incremental data values, the account details for the transaction account used by the processing server 102, and the transaction identifier. In step 322, the sender device 104 may prompt the payer as a user of the sender device 104 to supply data for the set of incremental data values. The payer may input the data or otherwise instruct the sender device 104 on how to obtain the data. Then, in step 324, the sender device 104 can initiate a first payment transaction using the first payment network 108 for payment to the transaction account used by the processing server 102 on the first payment network 108. The payment transaction may be processed by the first payment network 108 where a transaction message for the payment transaction includes the data for the set of incremental data values and the transaction identifier.

In step 326, the receiving device 202 of the processing server 102 can receive a notification message for the first payment transaction, such as may be received from the first payment network 108, the technical server 112, or other suitable entity or system. The notification message may include the transaction message for the first payment transaction or other data included therein, including the transaction identifier and data for the set of incremental data values. In step 328, the generation module 218 of the processing server 102 can generate a transaction message for a second payment transaction or other data message for use in initiating a second payment transaction. The transaction message can include the data for the set of incremental data values and any other necessary data as well as the transaction data. In step 330, the transmitting device 222 of the processing server 102 can electronically transmit the second transaction message or other data message to the second payment network 110, either directly or via an intermediary system, for the second payment transaction. The second payment transaction may be for a payment made from a transaction account used by the processing server 102 on the second payment network 110 and to the transaction account corresponding to the transaction details provided by the recipient device 106 and received by the processing server 102 in the payment request. In step 332, the second payment network 110 may receive and process the second payment transaction using suitable methods and, in step 334, the processing server 102 or second payment network 110 may transmit a notification to recipient device 106 regarding receipt of payment via the second payment transaction. In step 336, the recipient device 106 may receive the notification. In some cases, the notification can include the transaction identifier to assist the recipient device 106 in corresponding to the received payment with the payment notification received in step 318.

Exemplary Method for Facilitating a Payment Transaction

FIG. 4 illustrates a method 400 for facilitating a payment transaction between incompatible and unconnected payment networks.

In step 402, a transaction request can be received by a receiver (e.g., receiving device 202) of a processing server (e.g., processing server 102) from a first computing device (e.g., sender device 104), the transaction request including at least a first payment network identifier and a second payment network identifier. In step 404, a processor (e.g., querying module 216) of the processing server 102 can identify a first network profile (e.g., network profile 208) associated with a first payment network (e.g., first payment network 108) based on the first network identifier and a second network profile (e.g., network profile 208) associated with a second payment network (e.g., second payment network 110) based on the second payment network identifier. In step 406, one or more incremental data values required for the second payment network may be identified by the processor (e.g., determination module 220) of the processing server based on a comparison of the first network profile and the second network profile. In step 408, the one or more incremental data values may be transmitted by a transmitter (e.g., transmitting device 222) of the processing server to the first computing device.

In one embodiment, the method 400 can further include: receiving, by the receiver of the processing server, a payment notification for a first payment transaction processed using the first payment network, wherein the payment notification includes at least a transaction amount and incremental data correspond to the one or more incremental data values; and initiating, by the transmitter of the processing server, a second payment transaction to a payee using the second payment network, wherein a transaction message for the second payment transaction includes at least a currency amount based on the transaction amount and the incremental data. In a further embodiment, the transaction request can include a transaction account number associated with the payee, and the transaction message can include the transaction account number. In another further embodiment, the method 400 can also include generating, by the processor (e.g., generation module 218) of the processing server, the transaction message, wherein the transaction message is formatted according to one or more standards governing the second payment network and includes one or more data fields storing at least the currency amount and the incremental data. In yet another further embodiment, the method 400 can even further include generating, by the processor of the processing server, a unique identifier, wherein the unique identifier is included in the payment notification, and the unique identifier is included in the transaction message.

In some embodiments, the first network profile can include a first set of standards governing payment transactions processed using the first payment network, the second network profile can include a second set of standards governing payment transactions processed using the second payment network, and the incremental data values can be based on one or more differences between the first set of standards and the second set of standards. In one embodiment, the method 400 can also include transmitting, by the transmitter of the processing server, a notification message regarding the transaction request to a second computing device (e.g., recipient device 106), wherein the second computing device is identified based on communication data, and wherein the transaction request includes the communication data. In some embodiments, the payment notification can be a transaction message for the first payment transaction formatted according to one or more standards governing payment transactions processed using the first payment network.

Computer System Architecture

Figure 5:
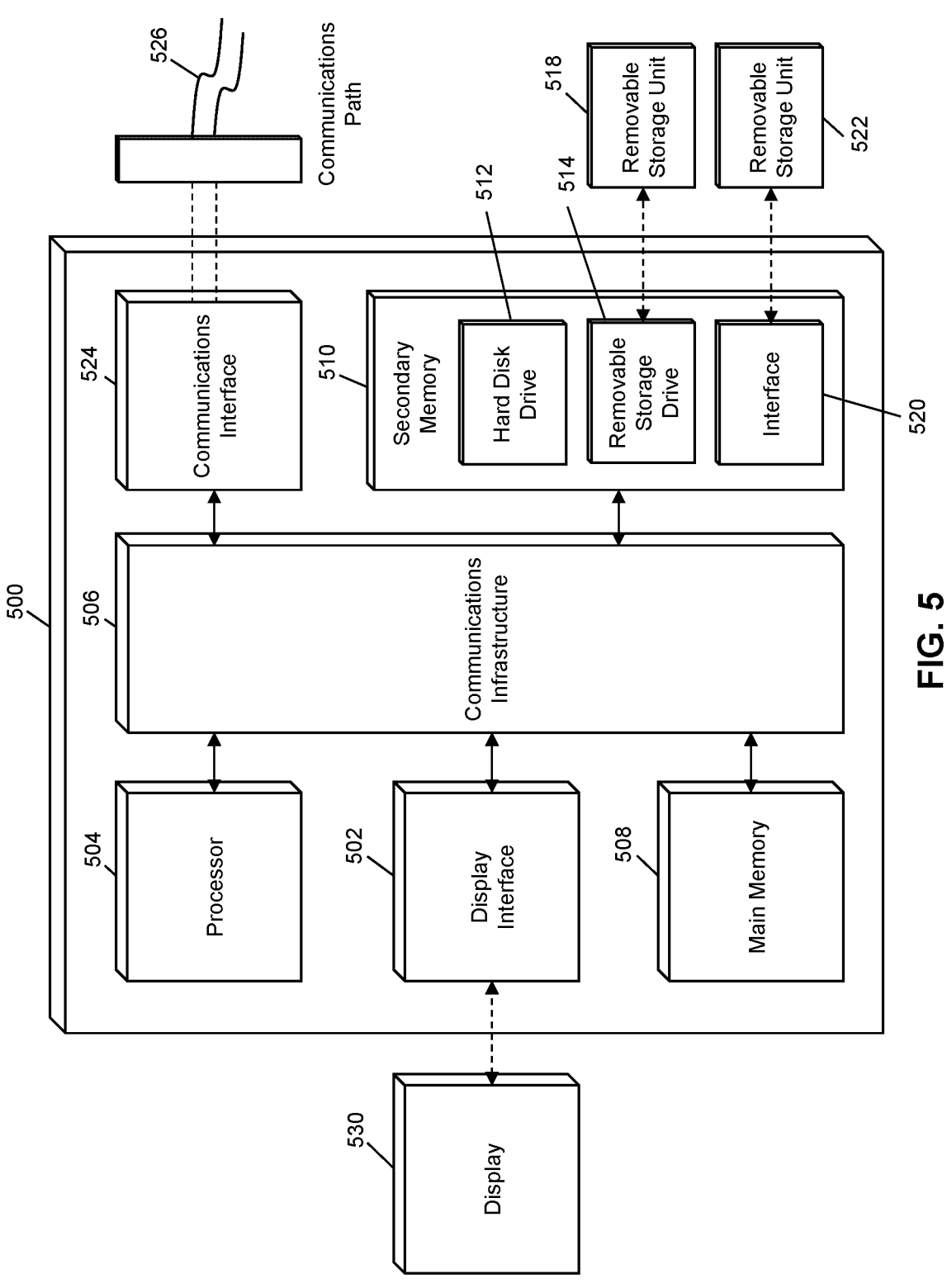
FIG. 5 is a block diagram illustrating a computer system architecture in accordance with exemplary embodiments.

FIG. 5 illustrates a computer system 500 in which embodiments of the present disclosure, or portions thereof, can be implemented as computer-readable code. For example, processing server 102 of FIGS. 1 and 2 and the sender device 104, recipient device 106, and technical server 112 of FIG. 1 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general-purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower-level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating a payment transaction between incompatible and unconnected payment networks. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for facilitating a payment transaction between incompatible and unconnected payment networks, comprising:

storing, in a network database of a processing server, a plurality of network profiles, each network profile being associated with a payment network and including at least a respective payment network identifier;

receiving, by a receiver of a processing server, a transaction request from a first computing device, the transaction request including at least a first payment network identifier associated with a first payment network selected by the first computing device and a second payment network identifier associated with a second payment network selected by a second computing device;

identifying, by a processor of the processing server, in the network database of the processing server, a first network profile, from the plurality of network profiles, that is associated with the first payment network based on the first payment network identifier included in the received transaction request and a second network profile, from the plurality of network profiles, that is associated with the second payment network based on the second payment network identifier;

based on an analysis of information included in the identified first network profile and the second network profile, determining, by the processor of the processing server, one or more incremental data values, wherein the one or more incremental data values include data values that are required by the second payment network that are not required by the first payment network; and transmitting, by a transmitter of the processing server, the one or more incremental data values to the first computing device.

2. The method of claim 1, further comprising:

receiving, by the receiver of the processing server, a payment notification for a first payment transaction processed using the first payment network, wherein the payment notification includes at least a transaction amount and incremental data correspond to the one or more incremental data values; and initiating, by the transmitter of the processing server, a second payment transaction to a payee using the second payment network, wherein a transaction message for the second payment transaction includes at least a currency amount based on the transaction amount and the incremental data.

3. The method of claim 2, wherein the transaction request includes a transaction account number associated with the payee, and the transaction message includes the transaction account number.

4. The method of claim 2, further comprising:

generating, by the processor of the processing server, the transaction message, wherein the transaction message is formatted according to one or more standards governing the second payment network and includes one or more data fields storing at least the currency amount and the incremental data.

5. The method of claim 2, further comprising:

generating, by the processor of the processing server, a unique identifier, wherein the unique identifier is included in the payment notification, and the unique identifier is included in the transaction message.

6. The method of claim 1, wherein the first network profile includes a first set of standards governing payment transactions processed using the first payment network, the second network profile includes a second set of standards governing payment transactions processed using the second payment network, and the incremental data values are based on one or more differences between the first set of standards and the second set of standards.

7. The method of claim 1, further comprising:

transmitting, by the transmitter of the processing server, a notification message regarding the transaction request to a second computing device, wherein the second computing device is identified based on communication data, wherein the transaction request includes the communication data.

8. The method of claim 1, wherein the payment notification is a transaction message for the first payment transaction formatted according to one or more standards governing payment transactions processed using the first payment network.

9. A system for facilitating a payment transaction between incompatible and unconnected payment networks, comprising:

a first payment network;

a second payment network;

a first computing device; and a processing server, the processing server including a network database storing a plurality of network profiles, wherein each network profile is associated with a payment network and includes at least a respective payment network identifier, a receiver receiving a transaction request from the first computing device, the transaction request including at least a first payment network identifier associated with the first payment network selected by the first computing device and a second payment network identifier associated with the second payment network selected by a second computing device, a processor identifying, in the network database of the processing server, a first network profile, from the plurality of network profiles, that is associated with the first payment network based on the first payment network identifier included in the received transaction request and a second network profile, from the plurality of network profiles, that is associated with the second payment network based on the second payment network identifier, and determining, based on an analysis of information included in the identified first network profile and the second network profile, one or more incremental data values, wherein the one or more incremental data values include data values that are required by the second payment network that are not required by the first payment network, and a transmitter transmitting the one or more incremental data values to the first computing device.

10. The system of claim 9, wherein the receiver of the processing server further receives a payment notification for a first payment transaction processed using the first payment network, wherein the payment notification includes at least a transaction amount and incremental data correspond to the one or more incremental data values, and the transmitter of the processing server further initiates a second payment transaction to a payee using the second payment network, wherein a transaction message for the second payment transaction includes at least a currency amount based on the transaction amount and the incremental data.

11. The system of claim 10, wherein the transaction request includes a transaction account number associated with the payee, and the transaction message includes the transaction account number.

12. The system of claim 10, wherein the processor of the processing server further generates the transaction message, wherein the transaction message is formatted according to one or more standards governing the second payment network and includes one or more data fields storing at least the currency amount and the incremental data.

13. The system of claim 10, wherein the processor of the processing server further generates a unique identifier, the unique identifier is included in the payment notification, and the unique identifier is included in the transaction message.

14. The system of claim 9, wherein the first network profile includes a first set of standards governing payment transactions processed using the first payment network, the second network profile includes a second set of standards governing payment transactions processed using the second payment network, and the incremental data values are based on one or more differences between the first set of standards and the second set of standards.

15. The system of claim 9, wherein the transmitter of the processing server further transmits a notification message regarding the transaction request to a second computing device, wherein the second computing device is identified based on communication data, and the transaction request includes the communication data.

16. The system of claim 9, wherein the payment notification is a transaction message for the first payment transaction formatted according to one or more standards governing payment transactions processed using the first payment network.

* * * * *